US011098725B2

(12) United States Patent
Sanger et al.

(10) Patent No.: US 11,098,725 B2
(45) Date of Patent: Aug. 24, 2021

(54) HYDRODYNAMIC HEATER PUMP

(71) Applicant: Ventech, LLC, Wixom, MI (US)

(72) Inventors: Jeremy Sanger, Milford, MI (US); Franco Garavoglia, Walled Lake, MI (US)

(73) Assignee: Ventech, LLC, Wixom, MI (US)

( * ) Notice: Subject to any disclaimer, the term of this patent is extended or adjusted under 35 U.S.C. 154(b) by 0 days.

(21) Appl. No.: 16/104,542

(22) Filed: Aug. 17, 2018

(65) Prior Publication Data
US 2020/0166044 A1    May 28, 2020

Related U.S. Application Data

(60) Provisional application No. 62/549,817, filed on Aug. 24, 2017.

(51) Int. Cl.
| | | |
|---|---|---|
| *F04D 27/00* | (2006.01) | |
| *F25B 30/06* | (2006.01) | |
| *F04D 19/00* | (2006.01) | |
| *B60H 1/00* | (2006.01) | |

(52) U.S. Cl.
CPC ......... *F04D 27/002* (2013.01); *F04D 19/002* (2013.01); *F25B 30/06* (2013.01); *B60H 2001/00114* (2013.01); *F25B 2400/01* (2013.01)

(58) Field of Classification Search
CPC .. F04D 27/002; F04D 19/002; F04D 15/0038; F04D 29/5866; F04D 29/5873; F04D 29/588; F04D 29/5886; F25B 30/06; F25B 2400/01; B60H 2001/00114; B60H 1/0035

See application file for complete search history.

(56) References Cited

U.S. PATENT DOCUMENTS

| | | | | |
|---|---|---|---|---|
| 5,683,031 | A * | 11/1997 | Sanger | F24V 40/00 237/1 R |
| 8,113,440 | B2 * | 2/2012 | Sanger | B60H 1/00485 237/12.3 B |
| 8,800,504 | B2 * | 8/2014 | Kernchen | B60T 10/02 123/41.44 |
| 2012/0210953 | A1 * | 8/2012 | Cronin | F24V 40/00 123/2 |

* cited by examiner

*Primary Examiner* — Christopher Verdier
*Assistant Examiner* — Eric A Lange
(74) *Attorney, Agent, or Firm* — Panagos Kennedy PLLC; Bill Panagos; Linda Kennedy

(57) ABSTRACT

A hydrodynamic heater pump may include a housing and a stator fixed relative to the housing. A rotor may be coaxially aligned with and positioned adjacent the stator. The rotor and the stator define an interior region of a hydrodynamic chamber operable for heating a fluid present within the interior region of the hydrodynamic chamber. The rotor may be attached to a drive shaft for concurrent rotation therewith. The rotor may be moved axially along an axis of rotation of the drive shaft between a pumping mode position and a heating mode position. The rotor may be located a first distance from the stator when arranged in the heating mode position and a second distance from the stator when arranged in the pumping mode position. The second distance may be greater than the first distance.

7 Claims, 6 Drawing Sheets

HYDRODYNAMIC HEATER PUMP

RELATED APPLICATIONS

This application claims the benefit of U.S. Provisional Application No. 62/549,817, entitled Hydrodynamic Heater/Pump, filed on Aug. 24, 2017, which is herein incorporated by reference in its entirety.

BACKGROUND

Conventional automotive vehicles typically include an engine cooling system for maintaining the vehicle's engine at a desired operating temperature and a heating system for supplying warm air to a passenger compartment of the vehicle. The cooling system may include a pump for generating a stream of pressurized fluid used to cool the vehicle's engine. The heating system may include a control system that allows a vehicle operator to regulate the quantity and/or temperature of air delivered to the passenger compartment to achieve a desirable air temperature within the passenger compartment. Cooling fluid from the vehicle's engine cooling system is commonly used as a source of heat for heating the air delivered to the passenger compartment.

The heating system typically includes a heat exchanger fluidly connected to the vehicle's engine cooling system. Warm cooling fluid from the engine cooling system passes through the heat exchanger and gives up heat to a cool air supply flowing through the heating system. The heat energy transferred from the warm cooling fluid to the cool air supply causes the temperature of the air to rise. The heated air is discharged into the passenger compartment to warm the interior of the vehicle to a desired air temperature.

The vehicle's engine cooling system provides a convenient source of heat for heating the vehicle's passenger compartment. One disadvantage of using the engine cooling fluid as a heat source, however, is that there is typically a significant delay between when the vehicle's engine is first started and when the heating system begins supplying air at a preferred temperature. This is particularly true when the vehicle is operated in very cold ambient conditions or has sat idle for a period of time. The delay is due to the cooling fluid being at substantially the same temperature as the air flowing through the heating system and into the passenger compartment when the engine is first started. As the engine continues to operate, a portion of the heat generated as a byproduct of combusting a mixture of fuel and air in the engine cylinders is transferred to the cooling fluid, causing the temperature of the cooling fluid to rise. Since, the temperature of the air being discharged from the heating system is a function of the temperature of the cooling fluid passing through the heat exchanger, the heating system will produce proportionally less heat while the engine cooling fluid is warming up than when the cooling fluid is at a preferred operating temperature. Thus, there may be an extended period of time between when the vehicle's engine is first started and when the heating system begins producing air at an acceptable temperature level. The time it takes for this to occur will vary depending on various factors, including the initial temperature of the cooling fluid and the initial temperature of the air being heated. It is preferable that the temperature of the cooling fluid reach its preferred operating temperature as quickly as possible.

Another potential limitation of using the engine cooling fluid as a heat source for the vehicle's heating system is that under certain operating conditions the engine may not be rejecting enough heat to the cooling fluid to enable the air stream from the vehicle's heating system to achieve a desired temperature. This may occur, for example, when operating a vehicle with a very efficient engine under a low load condition or in conditions where the outside ambient temperature is unusually cold. Both of these conditions reduce the amount of heat that needs to be transferred from the engine to the cooling fluid to maintain a desired engine operating temperature. This results in less heat energy available for heating the air flowing through the vehicle's heating system.

SUMMARY

Disclosed herein is a hydrodynamic heater pump that may be operated to selectively generate a stream of heated fluid and/or pressurized fluid. Hydrodynamic heater pump may be operated in a heater mode for generating a stream of heated fluid and a pump mode for generating a stream of pressurized fluid. The hydrodynamic heater pump may be employed with a variety of systems requiring a source of heat and/or stream of pressurized fluid. For example, the hydrodynamic heater pump may be incorporated in an automotive engine cooling system to provide primary or supplemental heat for heating a passenger compartment of a vehicle and/or provide other functions, such as windshield deicing. Heated fluid discharged from the hydrodynamic heater pump may be used directly or in conjunction with one or more heat exchangers to provide a stream of heated fluid. The hydrodynamic heater pump may function as a primary source of heat or operate to supplement heat provide by another heat source.

The hydrodynamic heater pump may include a generally toroidal-shaped hydrodynamic chamber defined by a rotor and a stator. The hydrodynamic chamber is operable for heating a fluid present within the hydrodynamic chamber. The stator and rotor may be located within a housing. The rotor may be coaxially aligned with and positioned adjacent the stator. The rotor and the stator define an interior region of the hydrodynamic chamber. The rotor may be attached to a drive shaft for concurrent rotation therewith. The rotor may be moved axially along an axis of rotation of the drive shaft between a pumping mode position and a heating mode position. The rotor may be located a first distance from the stator when arranged in the heating mode position and a second distance from the stator when arranged in the pumping mode position. The second distance may be greater than the first distance.

BRIEF DESCRIPTION OF THE DRAWINGS

The various features, advantages and other uses of the present apparatus will become more apparent by referring to the following detailed description and drawings, in which.

DETAILED DESCRIPTION

Figure 1:
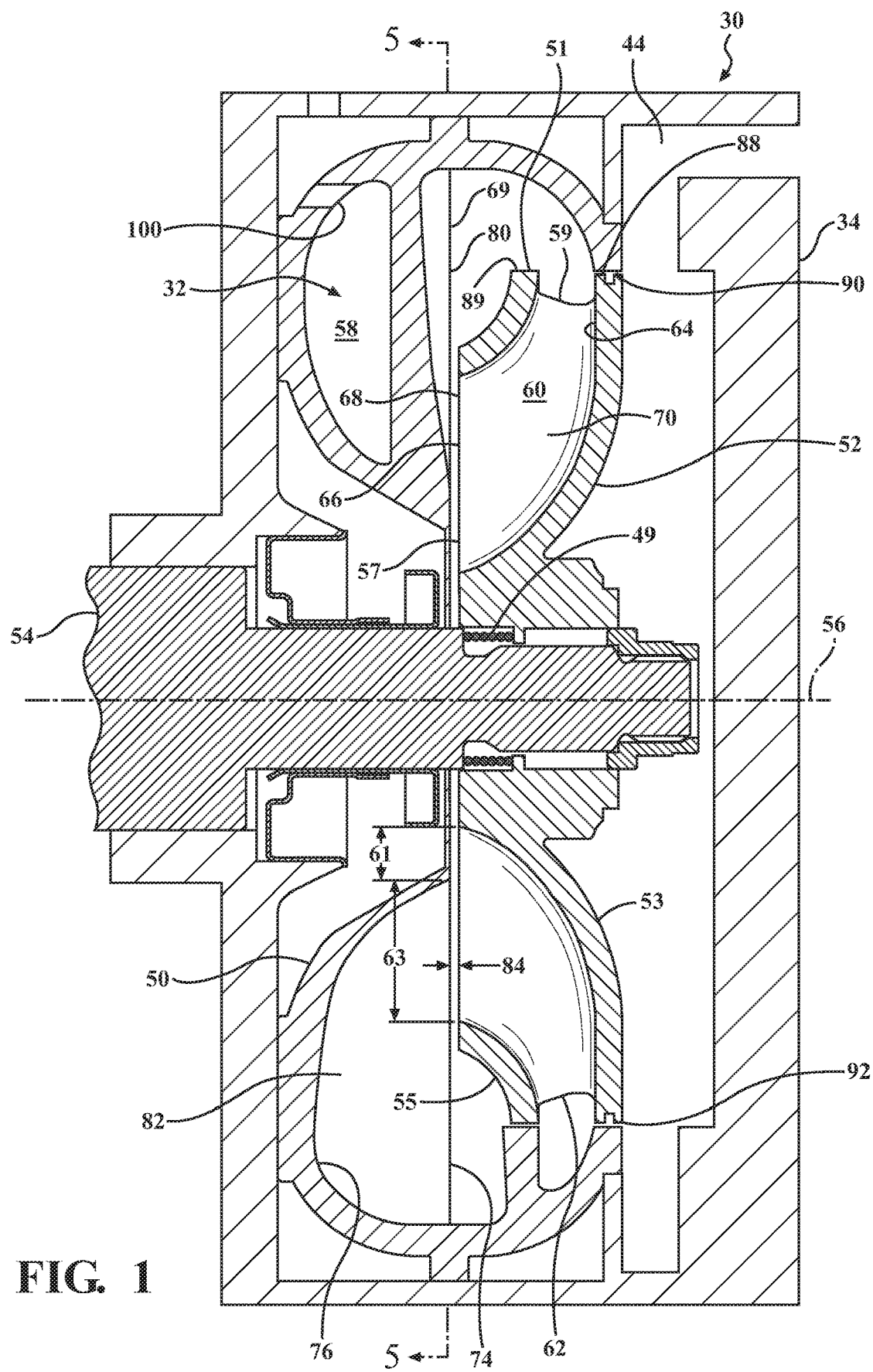
FIG. 1 is a partial cross-sectional view of a hydrodynamic heater pump arranged in a heating mode.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive, otherwise limit, or restrict the claims to the precise forms and configurations shown in the drawings and disclosed in the following detailed description.

With reference to FIGS. 1, 2, 6 and 7, disclosed is a hydrodynamic heater pump 30 operable to selectively generate a stream of heated fluid and/or pressurized fluid. Hydrodynamic heater pump 30 may be operated in a heater mode, as illustrated, for example, in FIGS. 1 and 6, and a pump mode, as illustrated, for example, in FIGS. 2 and 7. Hydrodynamic heater pump 30 may be employed with a variety of systems requiring a source of heat and/or stream of pressurized fluid. For example, the hydrodynamic heater pump 30 may be incorporated in an automotive engine cooling system to provide primary or supplemental heat for heating a passenger compartment of a vehicle and/or provide other functions, such as windshield deicing. Hydrodynamic heater pump 30 may be used in a wide variety of applications that utilize a heat source. Heated fluid discharged from hydrodynamic heater pump 30 may be used directly or in conjunction with one or more heat exchangers to provide a stream of heated fluid. Hydrodynamic heater pump 30 may function as a primary source of heat or operate to supplement heat provide by another heat source.

Hydrodynamic heater pump 30 may include a generally toroidal-shaped hydrodynamic chamber 32 operable for heating a fluid present within hydrodynamic chamber 32. Hydrodynamic chamber 32 may be enclosed within a housing 34. Hydrodynamic heater pump 30 may include a heater pump inlet passage 36 for supplying fluid to hydrodynamic heater pump 30. Heater pump inlet passage 36 may fluidly connect hydrodynamic chamber 32 to an external fluid source. Heater pump inlet passage 36 may branch into two separate passages. A heater inlet passage 38 may fluidly connect heater pump inlet passage 36 to hydrodynamic chamber 32 when operating hydrodynamic heater pump 30 in the heater mode and the pump mode. A pump inlet passage 40 may fluidly connect heater pump inlet passage 36 to hydrodynamic heater pump 30 when operating hydrodynamic heater pump 30 in the pump mode. A check valve 41 may be used to prevent fluid flowing from hydrodynamic chamber 32 to heater pump inlet passage 36.

Hydrodynamic heater pump 30 may include a hydrodynamic chamber discharge passage 42 and pump outlet passage 44 fluidly connected to hydrodynamic chamber 32 for transferring fluid from hydrodynamic chamber 32. Hydrodynamic chamber discharge passage 42 provides a fluid path for transporting a stream of heated fluid generated when operating hydrodynamic heater pump 30 in the heater mode. A fluid path through hydrodynamic chamber discharge passage 42 is substantially blocked when operating hydrodynamic heater pump in the pump mode.

A control valve 46 having a control valve inlet passage 43 fluidly connected to hydrodynamic chamber discharge passage 42 may be employed for controlling the flow of heated fluid discharged from hydrodynamic heater pump 30. Hydrodynamic heater pump 30 may further include a controller for regulating operation of hydrodynamic heater pump 30 and control valve 46. Control valve 46 may alternately be configured as a pressure relief valve 48. Control valve 46 may include a control valve outlet passage 45 fluidly connected to pump outlet passage 44 through a control valve discharge passage 47 (see FIGS. 6 and 7).

With reference to FIGS. 1-7, hydrodynamic chamber 32 may include a stator 50 and a coaxially aligned rotor 52 positioned adjacent stator 50. Stator 50 may be fixedly attached to housing 34. Rotor 52 may be mounted on a drive shaft 54 for concurrent rotation therewith about an axis of rotation 56 relative to the stator 50 and housing 34. Rotor 52 may also be selectively moved axially along the axis of rotation 56 relative to stator 50 between a heater mode position, as illustrated, for example, in FIGS. 1 and 6, and a pump mode position, as illustrated, for example, in FIGS. 2 and 7. Stator 50 may overlap an outer periphery 51 of rotor 52 when stator 50 is arranged in the heater mode position, as illustrated, for example, in FIGS. 1 and 6. A biasing member 49, such as coil spring, may be used to urge rotor 52 to move axially away from stator 50 and into the pump mode position. An actuator may provide a drive force for moving rotor 52 from the pump mode position to the heater mode position. The default position may be the pump mode position or the heater mode position.

Figure 2:
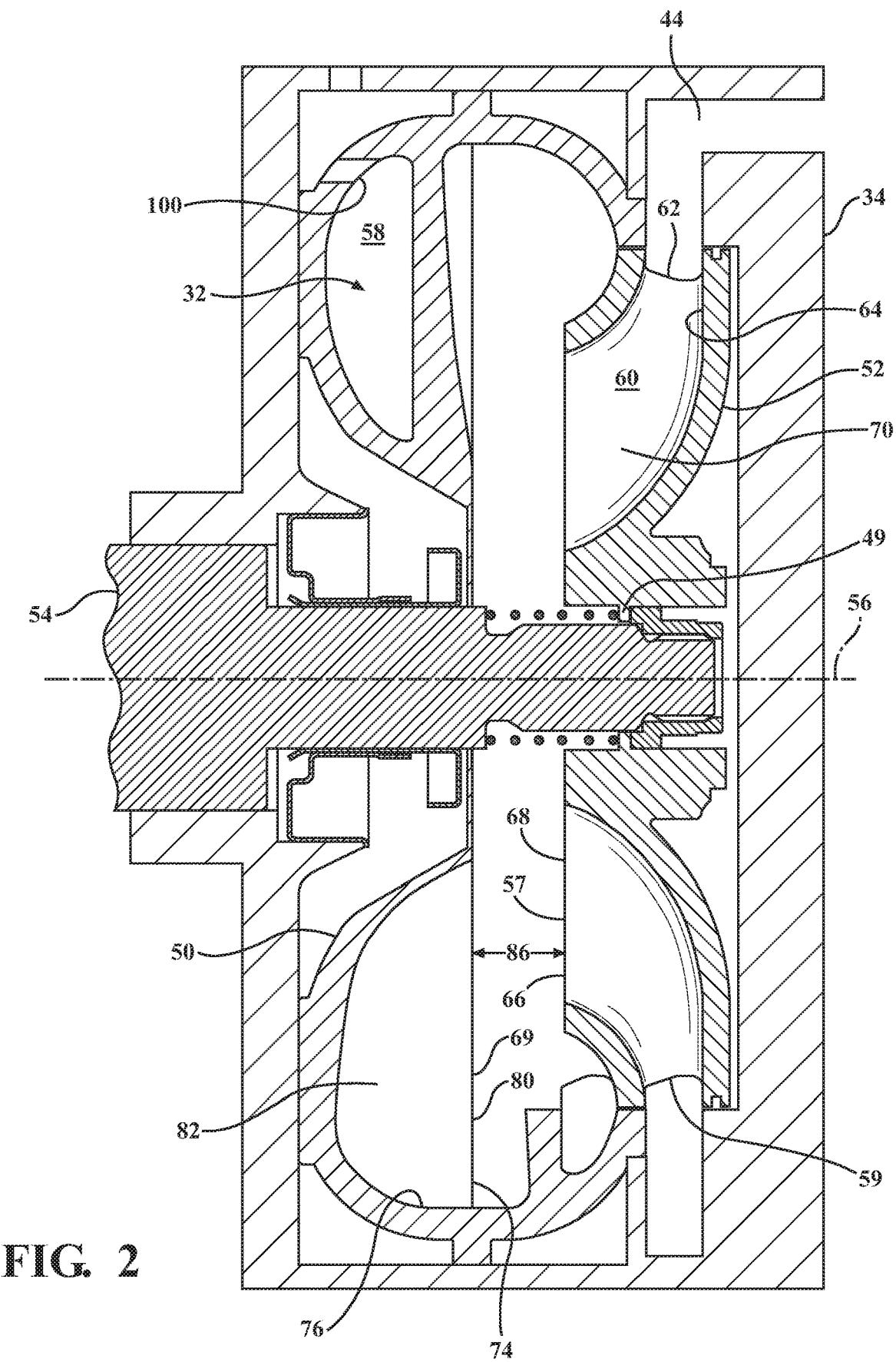
FIG. 2 is a partial cross-sectional view of the hydrodynamic heater pump arranged in a pumping mode.
Figure 3:
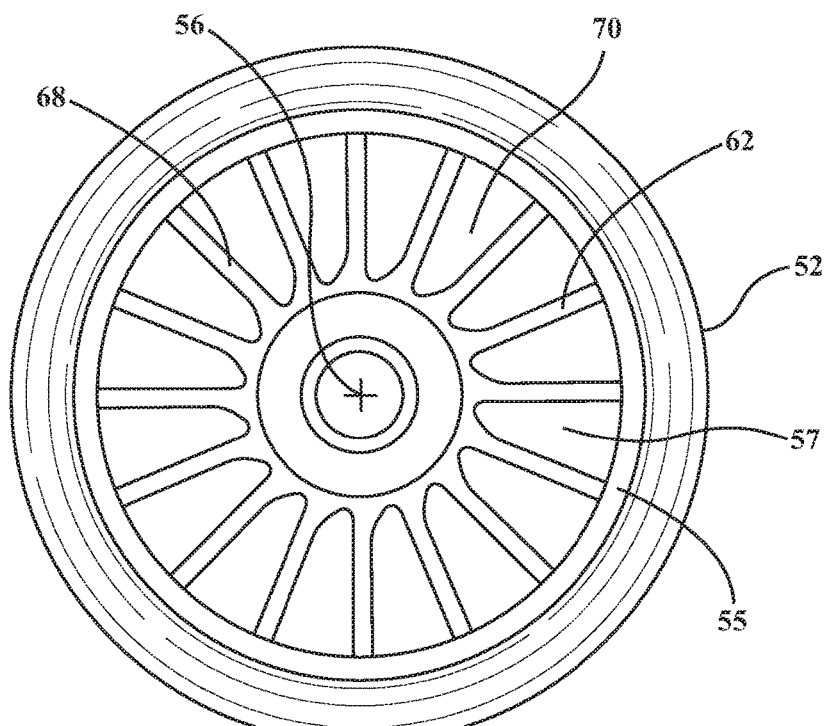
FIG. 3 is a front view of a rotor that may be employed with the hydrodynamic heater pump.

With reference to FIGS. 1-3, stator 50 may include a stator annular cavity 58 and rotor 52 may include a rotor annular cavity 60, which together define hydrodynamic chamber 32. Rotor 52 may include a rotor back wall 53 and a rotor front wall 55 displaced from the rotor back wall 53. The rotor front wall 55 and rotor back wall 53 define a rotor passage 70 having a rotor inlet 57 and a rotor outlet 59. Rotor 52 may include a plurality of rotor blades 62 arranged circumferentially within annular cavity 60 of rotor 52. Rotor blades 62 extend between rotor back wall 53 and rotor front wall 55. Rotor blades 62 extend generally radially outward relative to the axis of rotation 56 and extend axially inward (i.e., toward a center of hydrodynamic chamber 32) from rotor back wall 53 of rotor 52 to a rotor front face 66 of rotor 52 located adjacent stator 50. Each rotor blade 62 includes a leading edge 68 located adjacent a stator front face 69 of stator 50. Rotor blades 62 may be inclined presenting an acute angle toward the direction of rotation of rotor 52 from leading edge 68 to interior back wall 64 of rotor 52. Rotor blades 62, rotor back wall 53 and rotor front wall 55 together define a plurality of rotor passages 70 circumferentially distributed within annular cavity 60 of the rotor 52.

Figure 4:
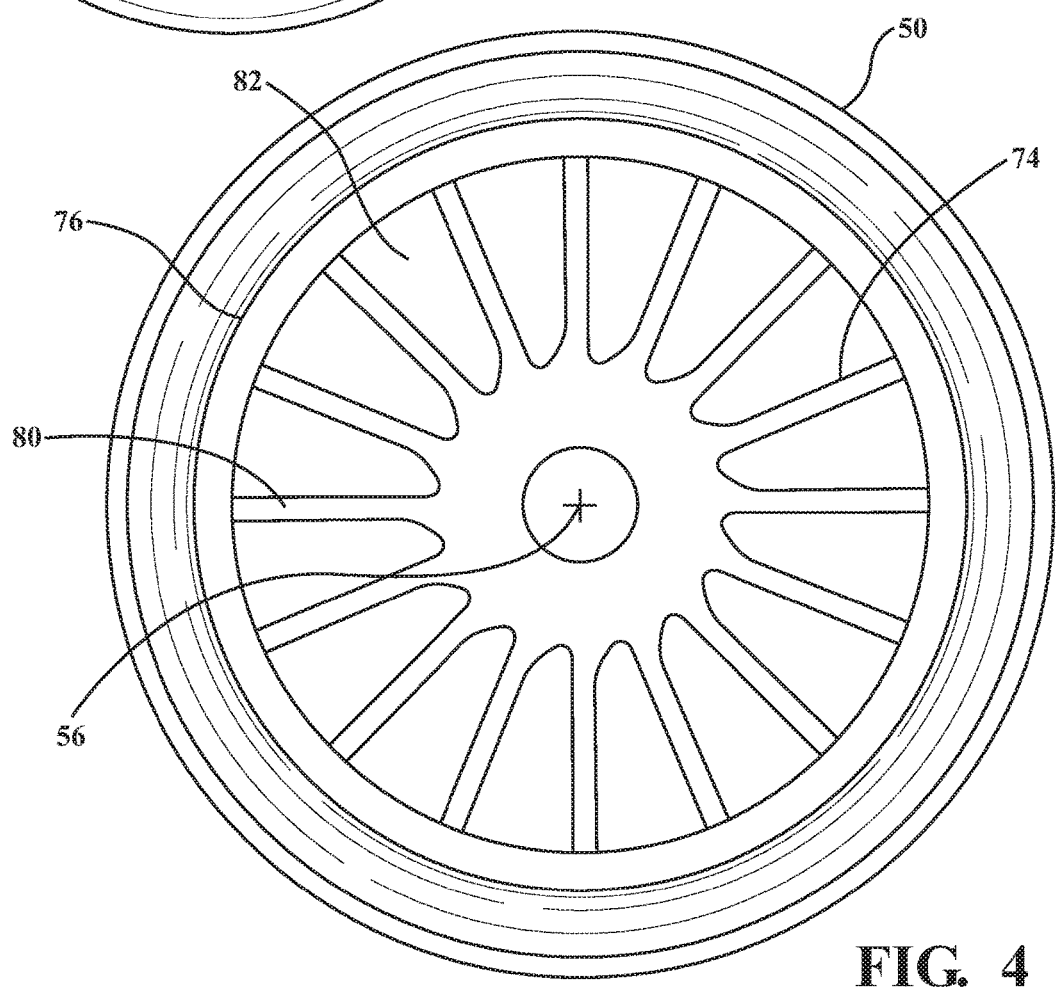
FIG. 4 is a front view of a stator that may be employed with the hydrodynamic heater pump.
Figure 5:
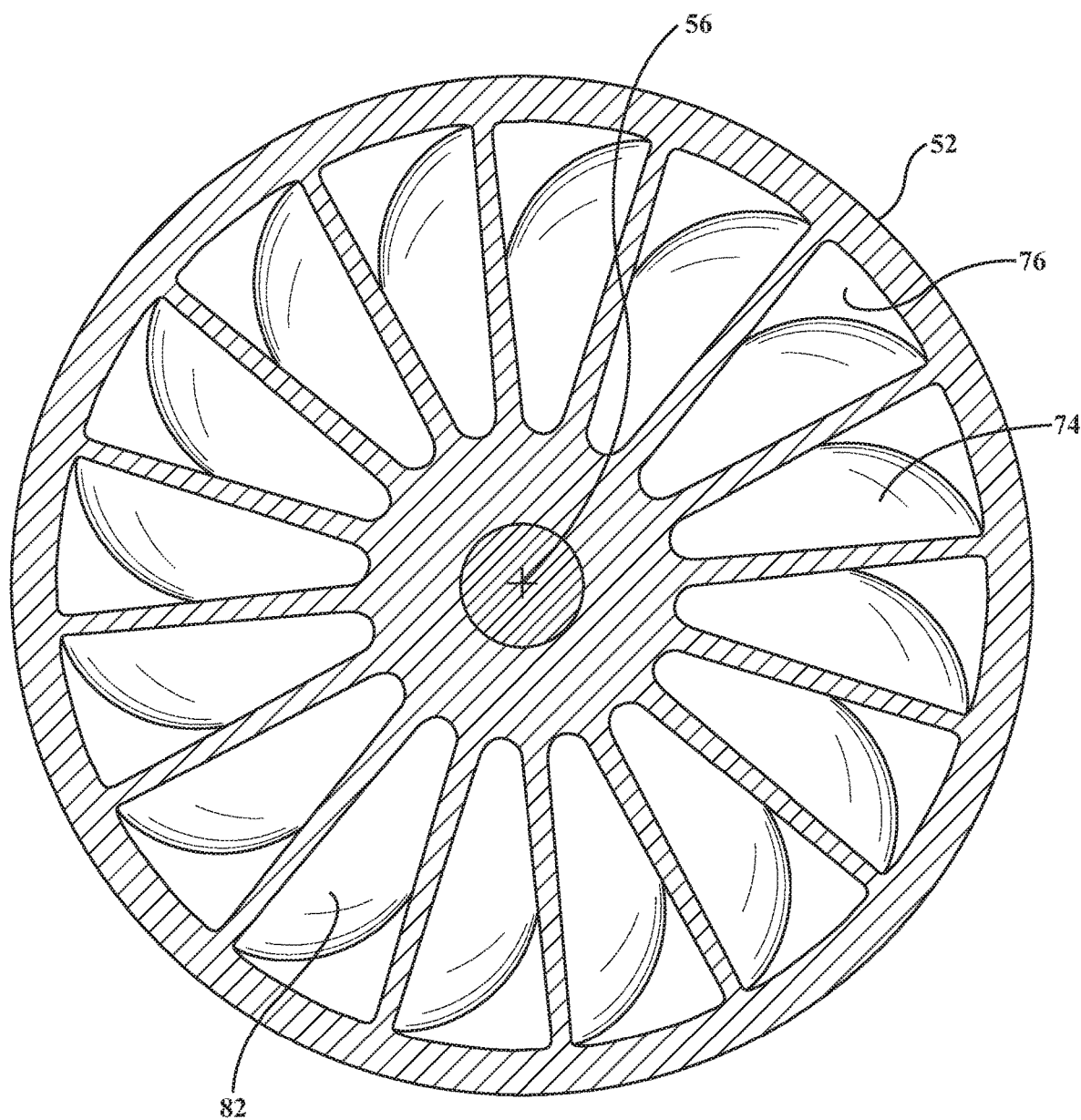
FIG. 5 is a cross-sectional view of the stator taken along section-line 5-5 of FIG. 1.

With reference also to FIGS. 4 and 5, stator 50 may include a plurality of stator vanes 74 arranged circumferentially within annular cavity 58 of stator 50. Stator vanes 74 extend generally radially outward relative to the axis of rotation 56 and extend axially inward (i.e., toward a center of hydrodynamic chamber 32) from a stator outer wall 76 of the stator 50 to stator front face 69 of stator 50 located adjacent rotor 52. Each stator vane 74 includes a leading edge 80 located adjacent rotor 52. Stator vanes 74 may be inclined presenting an acute angle toward the direction of rotation of rotor 50 from leading edge 80 to the stator outer wall 76 of stator 50. Stator vanes 74 and the stator outer wall 76 of the stator 50 together define a plurality of bucket-shaped stator cavities 82 circumferentially distributed within stator annular cavity 58 of stator 50.

With reference to FIGS. 1, 2, 6 and 7, the axial location of rotor 52 relative to stator 50 may be varied depending on whether the hydrodynamic heater pump 30 is operating in the heater mode or the pump mode. A distance "D" between rotor front face 66 and stator front face 78 increases when rotor 52 is moved from the heater mode position, as illustrated, for example, in FIGS. 1 and 6, and the pumping mode position, as illustrated, for example, in FIGS. 2 and 7. Rotor front face 66 may be spaced a first distance 84 from stator front face 78 when operating hydrodynamic heater pump 30 in the heater mode and rotor front face 66 may be spaced a second distance 86 from stator front face 78 when operating hydrodynamic heater pump 30 in the pump mode. Second distance 86 being greater than first distance 84.

With rotor 52 located in the heating position, rotor inlet 57 may include a rotor inlet first portion 61 fluidly connected to heater pump inlet passage 36 and a rotor inlet second portion 63 fluidly connected to the hydrodynamic chamber 32. Rotor inlet second portion 63 may be located radially outside of the rotor inlet first portion 61.

With continued reference to FIGS. 1-4, a rotor back wall circumferential edge 88 and a rotor front wall circumferential edge 89 may be sized radially smaller than an stator outer wall circumferential edge 90 to provide a clearance between rotor 52 and stator 50. This forms a gap 92 through which fluid can pass from hydrodynamic chamber 32 to pump outlet passage 44. The gap 92 may be sized to achieve a desired flow rate through gap 92.

Moving stator 52 from the heater mode position (i.e., FIGS. 1 and 6) to the pump mode position (i.e., FIGS. 2 and 7) enlarges a fluid flow path between hydrodynamic chamber 32 and pump outlet passage to substantially increase the flow of fluid being discharged from hydrodynamic chamber 32. With rotor 52 arranged in the heater mode position, hydrodynamic heater pump 30 primarily operates as a heater to heat fluid present within hydrodynamic chamber 32. With rotor 52 arranged in the pump mode position, hydrodynamic heater pump 30 primarily operates as a pump to provide a stream of pressurized fluid through pump outlet passage 44.

Power for rotatably driving rotor 52 may be supplied by an external power source, for example, an internal combustion engine or an electric motor.

With reference to FIGS. 1, 2, 6 and 7, hydrodynamic chamber 32 may include a hydrodynamic chamber outlet port 100 located along stator outer wall 76 of stator 50. The hydrodynamic chamber outlet port 100 may be positioned within an outermost half of hydrodynamic chamber 32.

Control valve 46 operates in conjunction with gap 92 between rotor 52 and stator 50 to selectively control a fluid temperature within hydrodynamic chamber 32. Control valve 46 may have various configurations, which may include, but are not limited to, mechanical, electro-mechanical, hydraulic and pneumatic actuated devices, as well as other configurations. Control valve 46 may also be configured as a pressure-relief valve 48.

Control valve 46 operates to selectively control a fluid temperature within hydrodynamic chamber 32 by adjusting an amount of fluid discharged from hydrodynamic chamber 32 through hydrodynamic chamber discharge passage 42. Control valve 46 may be selectively adjusted between the fully closed position, in which control valve 46 substantially blocks fluid from flowing between hydrodynamic chamber outlet port 100 and pump outlet passage 44, and a fully open position in which fluid is allowed to pass from through hydrodynamic chamber outlet port 100 to pump outlet passage 44. Control valve 46 may be infinitely adjustable between the fully open position and the fully closed position.

Hydrodynamic heater pump 30 may be integrated into a selected application by fluidly connecting heater pump inlet passage 36 to an external fluid source. Fluid entering hydrodynamic heater pump 30 from the external fluid source may be heated and discharged from hydrodynamic heater pump 30 through pump outlet passage 44. Suitable hoses, pipes, tubes and various other fluid connections may be used to fluidly connect pump outlet passage 44 to the associated components employed in the particular application.

Hydrodynamic heater/pump 30 may be selectively operated in the heater mode and the pump mode. To initiate operation in the heater mode, rotor 52 may be located in the heater mode position, as illustrated, for example, in FIGS. 1 and 6. Fluid from a fluid source may be supplied to hydrodynamic chamber 32 through heater pump inlet passage 36 and heater inlet passage 38. Fluid flow through pump inlet passage 40 is substantially block by check valve 41 when operating hydrodynamic heater pump 30 in the heater mode. Control valve 46 may be arranged in the open position to allow heated fluid to flow from hydrodynamic chamber 32 through hydrodynamic chamber outlet port 100 to pump outlet passage 44. A quantity of heated fluid may also be discharged from hydrodynamic chamber 32 into pump outlet passage 44 through gap 92 between rotor back wall 53 and stator outer wall 76.

Fluid present within hydrodynamic chamber 32 travels along a generally toroidal path within hydrodynamic chamber 32, increasing its temperature as the fluid travels back and forth between annular cavities 58 and 60 of stator 50 and rotor 52, respectively, gaining thermodynamic energy as its circulating speed increases. Fluid present in hydrodynamic chamber 32 continues to travel along the path between rotor 52 and stator 50 until discharged from hydrodynamic chamber 32 through hydrodynamic chamber outlet port 100 and gap 92. The heated fluid may be discharged from hydrodynamic heater pump 30 through pump outlet passage 44.

Figure 7:
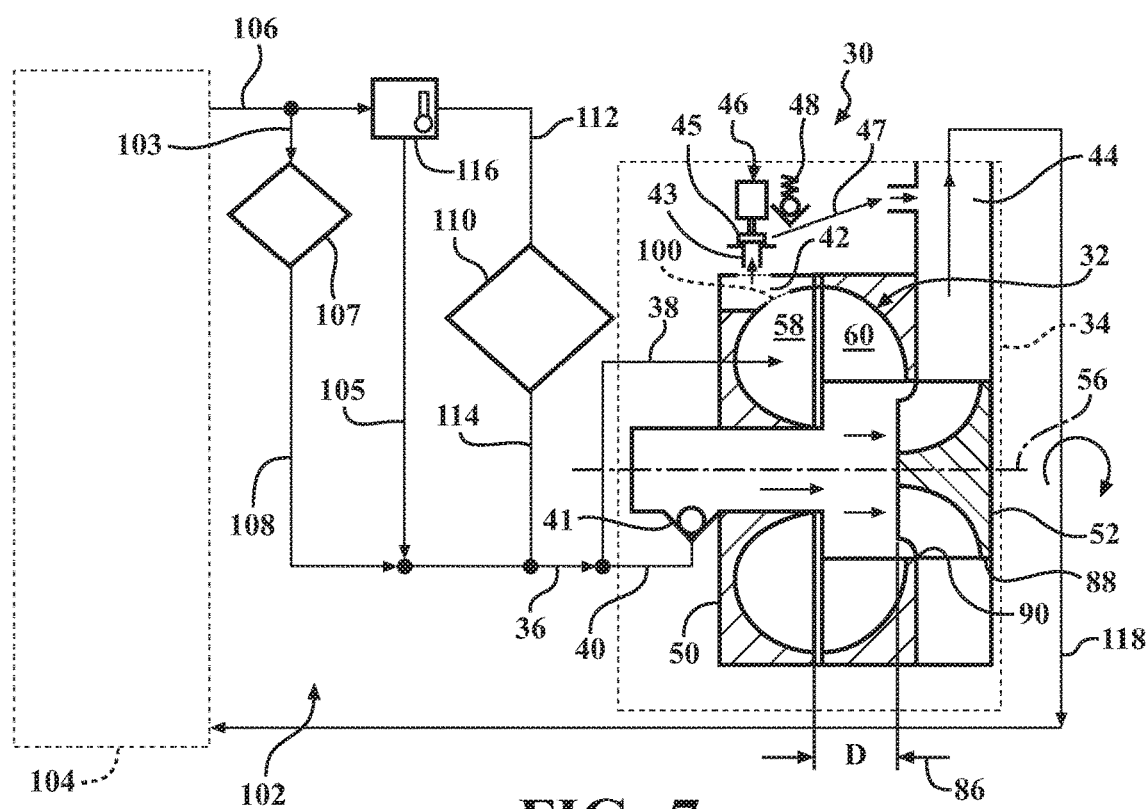
FIG. 7 is a schematic illustration of the engine cooling system employing the hydrodynamic heater pump arranged in the pumping mode.

To initiate operation of hydrodynamic heater pump 30 in the pumping mode, rotor 52 may be located in the pumping mode position, as illustrated, for example, in FIGS. 2 and 7. Fluid from a fluid source may be supplied to hydrodynamic chamber 32 through heater pump inlet passage 36 and heater inlet passage 38 and pump inlet passage 40. The quantity of fluid flow when operating in the pumping mode is sufficient to overcome the biasing force of check valve 41 to cause the valve to open. Control valve 46 may be arranged in the closed position to substantially block the flow of fluid from hydrodynamic chamber 32 through hydrodynamic chamber outlet port 100 to pump outlet passage 44. Substantially the entire flow of fluid supplied to hydrodynamic chamber 32 through pump inlet passage 40 flows past rotor 52 and into pump outlet passage 44.

Hydrodynamic heater/pump 30 may be employed in a wide variety of applications to provide a supply of heat and/or flow of pressurized fluid as may be required for the particular application. For example, hydrodynamic heater pump 30 may be incorporated in an automotive vehicle cooling system to provide heat for warming a passenger compartment of the vehicle and to provide other capabilities, such as window deicing and engine cooling. The hydrodynamic heater pump 30 may also provide a stream of pressurized fluid for cooling an engine.

Figure 6:
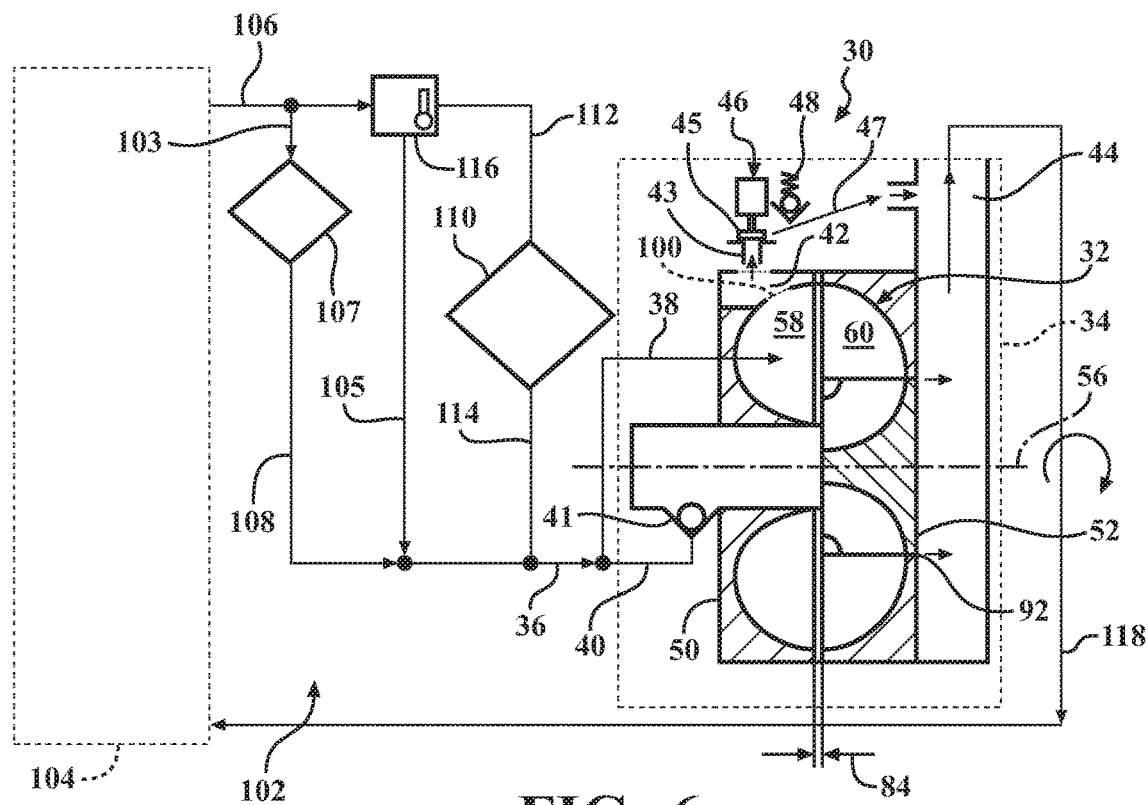
FIG. 6 is a schematic illustration of an engine cooling system employing the hydrodynamic heater pump arranged in the heater mode.

An example of hydrodynamic heater pump 30 integrated in a typical automotive cooling system 102 is schematically illustrated in FIGS. 6 and 7. Vehicle cooling system 102 functions to regulate an operating temperature of an engine 104. Hydrodynamic heater pump 30 may function as a water pump (i.e., when operating in the pumping mode) to circulate a cooling fluid through engine 104 to transfer excess heat produced by engine 104 to ambient. The excess heat is a byproduct of combusting a mixture of fuel and air in cylinders of engine 104 to produce usable mechanical work for propelling the vehicle.

Hydrodynamic heater pump 30 may be powered by an engine accessory drive. The accessory drive may be connected to a crankshaft of engine 104. The cooling fluid may be circulated through passages in engine 104 where the cooling fluid absorbs at least some of the excess heat. After circulating through engine 104, the cooling fluid may be discharged from engine 104 through an engine discharge passage 106. Depending on the temperature of the cooling fluid exiting engine 104, the cooling fluid may be directed back to hydrodynamic heater pump 30 through a return passage 105 and/or by passing through a heat exchanger 107 fluidly connected to heater pump inlet passage 36 by a heat exchanger discharge passage 108. Heat exchanger 107 may be fluidly connected to engine discharge passage 106 through a heat exchanger supply passage 103. If the temperature of the cooling fluid is sufficiently high, the cooling fluid may be directed to a radiator 110 through a radiator supply passage 112. Return passage 105 may be fluidly connected to heat exchanger discharge passage 108 and radiator 110 may be fluidly connected to heat exchanger discharge passage 108 through a radiator discharge passage 114.

A thermostat 116 operates to control distribution of the cooling fluid discharged from engine 104 between heat exchanger supply passage 103 and radiator supply passage 112. Thermostat 116 may be configured as a thermally activated valve capable of automatically adjusting its fluid thru-flow area depending on a temperature of the cooling fluid discharged from engine 104 through engine discharge passage 106. An automotive thermostat is one example of a thermally activate valve. Automotive thermostats may be calibrated to begin opening at a predetermined cooling fluid temperature (measured within thermostat 116), for example 190 degrees Fahrenheit. At cooling fluid temperatures below the calibrated temperature, thermostat 116 may be fully closed to prevent cooling fluid from being supplied to radiator 110 through radiator supply passage 112. At temperatures at or slightly above the calibrated temperature, thermostat 116 begins opening to allow a portion of cooling fluid from engine 104 to be directed to radiator 110. Thermostat 116 may be completely open at a cooling fluid temperature significantly higher than the calibrated temperature to maximize the flow rate of cooling fluid to radiator 110 for a particular vehicle operating condition.

Cooling fluid passing through radiator supply passage 112 flows through radiator 110, where the fluid rejects a portion of its heat to a stream of ambient air flowing across radiator 110. Cooling fluid exits radiator 110 at a lower temperature than the temperature of the cooling fluid entering radiator 110 and is directed to hydrodynamic heater pump 30 through heater pump inlet passage 36.

Heat exchanger 107 may be part of a heating system for providing a supply of warm air to heat a passenger compartment of the vehicle. All or a portion of the cooling fluid exiting engine 104 through engine discharge passage 106 may pass through heat exchanger 107. The cooling fluid rejects a portion of its heat to a stream of air made to flow over heat exchanger 107. The airstream may include air drawn from outside the vehicle, from the passenger compartment of the vehicle, or a combination thereof. The airstream exits heat exchanger 107 at a higher temperature than when it entered. The warm airstream may be discharged into the passenger compartment to warm the interior of the vehicle. The warm airstream may also be directed to flow over an interior glass surface of the vehicle to remove frost or condensation that may have formed on the glass surface. The heating system may also include various control devices for regulating a temperature and flow rate of the airstream being supplied to the passenger compartment of the vehicle.

With reference to FIG. 6, when operating hydrodynamic heater pump 30 in the heater mode, cooling fluid discharged from engine 104 through engine discharge passage 106 flows through heat exchanger 107 and on to hydrodynamic heater pump 30 through heat exchanger discharge passage 108, which is fluidly connected to heater pump inlet passage 36 of hydrodynamic heater pump 30. Cooling fluid flowing through engine discharge passage 106 is blocked from flowing through radiator supply passage 108 to radiator 110 by thermostat 116. Cooling fluid passing through heater pump inlet passage 36 may be discharged into hydrodynamic chamber 32 through heater inlet passage 38. Fluid may be blocked from passing through pump inlet passage 40 by check valve 41. The cooling fluid may be heated within hydrodynamic chamber 32 and discharged through hydrodynamic chamber outlet port 100. Control valve 46 may be arranged in the open position when operating hydrodynamic heater pump 30 in the heater mode, thereby allowing heated cooling fluid to be discharged from hydrodynamic chamber 32 and flow through control valve discharge passage 47 to pump outlet passage 44. A quantity of heated cooling fluid may also flow through gap 92 between rotor 52 and stator 50 to pump outlet passage 44. An engine supply passage 118 may fluidly connect pump outlet passage 44 to engine 106. Heated cooling fluid discharged from hydrodynamic heater pump 30 may be directed back to engine 104 through engine supply passage 118.

With reference to FIG. 7, when operating hydrodynamic heater pump 30 in the pumping mode, cooling fluid discharged from engine 104 through engine discharge passage 106 may flow through heat exchanger 107 and on to hydrodynamic heater pump 30 through heat exchanger discharge passage 108. Cooling fluid flowing through engine discharge passage 106 may be allowed to pass through thermostat 116 and on to radiator 110 through radiator supply passage 112. Cooling fluid discharged from radiator 110 passes through radiator discharge passage 114 to heater pump inlet passage 36. Cooling fluid passing through heater pump inlet passage 36 enters hydrodynamic chamber 32 through heater inlet passage 38 and pump inlet passage 40. The rate of fluid flow through heater pump inlet passage 36 when operating hydrodynamic heater pump 30 in the pumping mode is sufficiently large to cause check valve 41 to open and allow cooling fluid to enter hydrodynamic chamber 32 through pump inlet passage 40. Control valve 46 may be arranged in the closed position when operating hydrodynamic heater pump 30 in the pumping, thereby causing cooling fluid to be blocked from passing from hydrodynamic chamber 32 though control valve discharge passage 47 to pump outlet passage 44. Cooling fluid discharged from hydrodynamic heater pump 30 through pump outlet passage 44 may be directed back to engine 104 through engine supply passage 118.

Figure 8:
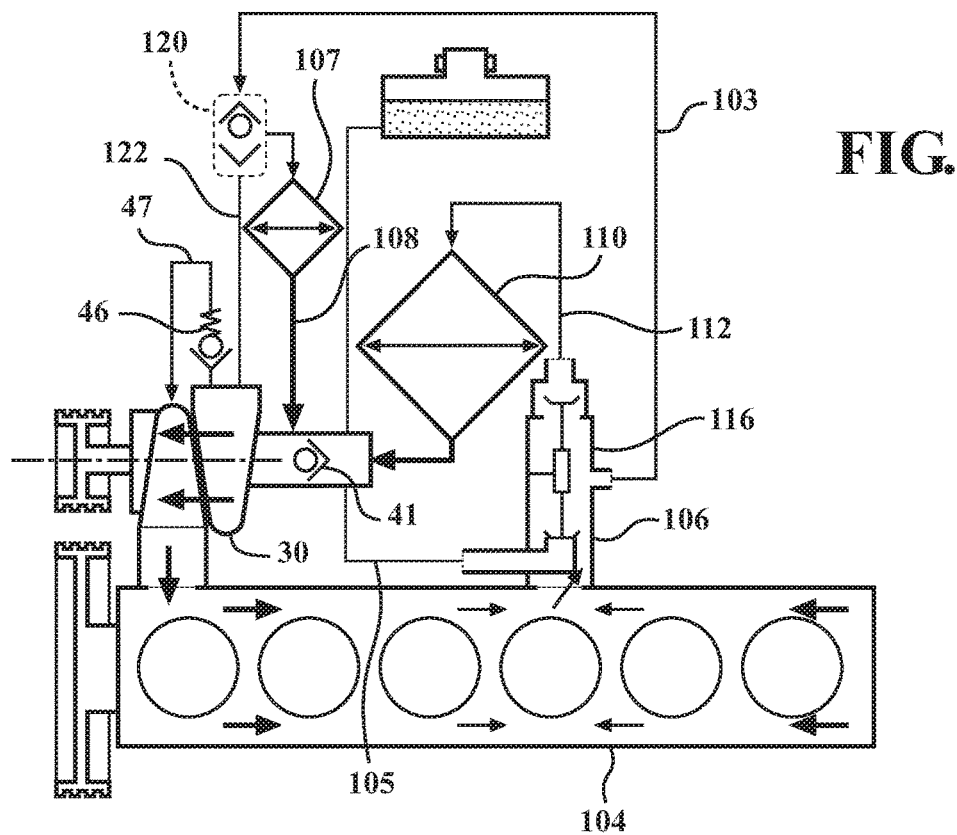
FIG. 8 is a schematic illustration of an engine cooling system employing a shuttle valve for controlling a flow of fluid to a heat exchanger, with the hydrodynamic heater pump arranged in the pumping mode.
Figure 9:
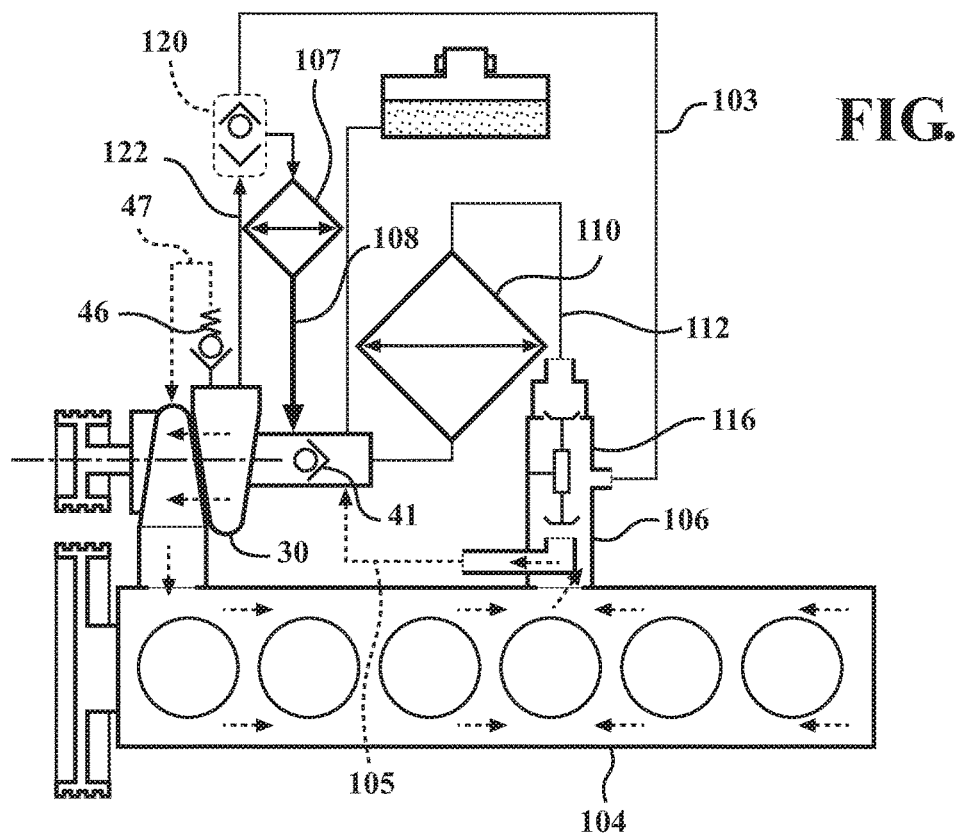
FIG. 9 is a schematic illustration of the engine cooling system employing the shuttle valve for controlling a flow of fluid to the heat exchanger, with the hydrodynamic heater pump arranged in the heating mode.

With reference to FIGS. 8 and 9, the heated fluid within hydrodynamic heater pump 30 may be redirected to expedite passenger compartment comfort by employing a shuttle valve 120 operable to direct a substantial amount of fluid flow capable of being discharged from hydrodynamic heater pump 30 back heat exchanger 107. Shuttle valve 120 may be fluidly integrated into heat exchanger supply passage 103. A shuttle valve inlet passage 122 may fluidly connect shuttle valve 120 to a flow of heated cooling fluid discharge from hydrodynamic heater pump 30. Shuttle valve 120 may be selectively arranged in a pumping mode, as illustrated, for example, in FIG. 8, and a dedicated heating mode, as illustrated, for example, in FIG. 9.

With reference to FIG. 8, operating shuttle valve 120 in the pumping mode causes hydrodynamic heater pump 30 to be substantially configured as illustrated in FIG. 7. Shuttle valve 120 may be arranged to allow cooling fluid discharged from engine 104 to be delivered to heat exchanger 107 through heat exchanger supply passage 103. Cooling fluid from engine 104 may also be allowed to flow to radiator 110 through thermostat 116. The fluid flow network illustrated in FIG. 8 operates substantially the same as the fluid flow network illustrated in FIG. 75.

With reference to FIG. 9, when operating in the dedicated heating mode hydrodynamic heater pump 30 may be configured substantially as illustrated in FIG. 4. Shuttle valve 120 may be arranged to block the flow cooling fluid discharged from engine 104 from entering heat exchanger 107 through heat exchanger supply passage 103. Heated cooling fluid discharged from hydrodynamic heater pump 30 may pass through shuttle valve inlet passage 122 and be directed back to heat exchanger 107 through shuttle valve 120. The heated cooling fluid passing through control valve discharge passage 47 and gap 92 accumulates in pump outlet passage 44 and is directed back to engine 104.

It is intended that the scope of the present methods and apparatuses be defined by the following claims. However, it must be understood that the various disclosed configurations and operation of the hydrodynamic heater pump+ may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

The invention claimed is:

1. A hydrodynamic heater pump comprising:
   a housing;
   a stator fixed relative to the housing;
   a rotor coaxially aligned with and positioned adjacent the stator, the rotor and the stator defining an interior region of a hydrodynamic chamber operable for heating a fluid present within the interior region;
   a drive shaft attached to the rotor for concurrent rotation therewith, the rotor moveable axially along an axis of rotation of the drive shaft between a pumping mode position and a heating mode position, the rotor located a first distance from the stator when arranged in the heating mode position and a second distance from the stator when arranged in the pumping mode position, the second distance being greater than the first distance; and
   a heater pump inlet passage and a pump outlet passage, wherein the rotor comprises a rotor back wall and a rotor front wall displaced from the rotor back wall, the rotor front wall and the rotor back wall define a rotor passage having a rotor inlet fluidly connected to the heater pump inlet passage and a rotor outlet, the stator comprising a stator outer wall defining the interior region of the hydrodynamic chamber, the rotor outlet fluidly connected to the interior region of the hydrodynamic chamber when the rotor is located in the heating mode position and fluidly connected to the pump outlet passage when the rotor is located in the pumping mode position, wherein a stator outer wall circumferential edge is located adjacent a rotor back wall circumferential edge and is displaced from a rotor front wall circumferential edge when the rotor is located in the heating mode position, and the stator outer wall circumferential edge is located adjacent the rotor front wall circumferential edge and is displaced from the rotor back wall circumferential edge when the rotor is located in the pumping mode position.

2. The hydrodynamic heater pump of claim 1, wherein the stator outer wall circumferential edge and the rotor back wall circumferential edge define a first hydrodynamic chamber discharge passage fluidly connecting the hydrodynamic chamber to the pump outlet passage when the rotor is located in the heating mode position.

3. The hydrodynamic heater pump of claim 1 further comprising a second hydrodynamic chamber discharge passage extending through the stator outer wall, the second hydrodynamic chamber discharge passaged fluidly connecting the hydrodynamic chamber to the pump outlet passage.

4. The hydrodynamic heater pump of claim 3 further comprising a control valve including a control valve inlet passage fluidly connected to the second hydrodynamic chamber discharge passage and a control valve outlet passage fluidly connected to the pump outlet passage.

5. A hydrodynamic heater pump system comprising:
   a hydrodynamic heater pump comprising:
      a heater pump inlet passage;
      a pump outlet passage;
      a housing;
      a stator fixed relative to the housing;
      a rotor coaxially aligned with and positioned adjacent the stator, the rotor and the stator define an interior region of a hydrodynamic chamber operable for heating a fluid present within the interior region; and
      a drive shaft attached to the rotor for concurrent rotation therewith, the rotor moveable axially along an axis of rotation of the drive shaft between a pumping mode position and a heating mode position, the rotor located a first distance from the stator when arranged in the heating mode position and a second distance from the stator when arranged in the pumping mode position, the second distance being greater than the first distance;

an engine including an engine cooling inlet passage fluidly connected to the pump outlet passage and an engine cooling outlet passage;

a first heat exchanger including a first heat exchanger inlet passage fluidly connected to the engine cooling outlet passage and a first heat exchanger outlet passage fluidly connected to the heater pump inlet passage;

wherein the rotor comprises a rotor back wall and a rotor front wall displaced from the rotor back wall, the rotor front wall and the rotor back wall define a rotor passage having a rotor inlet fluidly connected to the heater pump inlet passage and a rotor outlet, the stator comprising a stator outer wall defining the interior region of the hydrodynamic chamber, the rotor outlet fluidly connected to the interior region of the hydrodynamic chamber when the rotor is located in the heating mode position and fluidly connected to the pump outlet passage when the rotor is located in the pumping mode position; and wherein a stator outer wall circumferential edge is located adjacent a rotor back wall circumferential edge and is displaced from a rotor front wall circumferential edge when the rotor is located in the heating mode position, and the stator outer wall circumferential edge is located adjacent the rotor front wall circumferential edge and is displaced from the rotor back wall circumferential edge when the rotor is located in the pumping mode position.

6. The hydrodynamic heater pump of claim 5, wherein the stator outer wall circumferential edge and the rotor back wall circumferential edge define a first hydrodynamic chamber discharge passage fluidly connecting the hydrodynamic chamber to the pump outlet passage when the rotor is located in the heating mode position.

7. The hydrodynamic heater pump of claim 6 further comprising a second hydrodynamic chamber discharge passage extending through the stator back wall, the second hydrodynamic chamber discharge passaged fluidly connecting the hydrodynamic chamber to the pump outlet passage.

* * * * *